United States Patent [19]

Ohlson

[11] Patent Number: 4,879,247

[45] Date of Patent: Nov. 7, 1989

[54] METHOD AND APPARATUS FOR ISOCRATIC AFFINITY CHROMATOGRAPHY

[75] Inventor: Sten Ohlson, Lund, Sweden

[73] Assignee: Perstorp Biolytica, Sweden

[21] Appl. No.: 160,579

[22] Filed: Feb. 26, 1988

[30] Foreign Application Priority Data

Mar. 6, 1987 [SE] Sweden ................................. 8700949

[51] Int. Cl.$^4$ ...................... G01N 33/53; B01D 15/08
[52] U.S. Cl. .................................... 436/527; 436/161; 422/70; 210/635; 210/198.2; 210/502.1; 502/403
[58] Field of Search .................. 422/70; 436/524, 527, 436/161; 210/198.2, 656, 653, 502.1; 502/403

[56] References Cited

FOREIGN PATENT DOCUMENTS 0059598 2/1982 European Pat. Off. .
83/03678 10/1983 PCT Int'l Appl. .

OTHER PUBLICATIONS

Turley et al., "Biochemistry", 1987, 26, 2997–3005.
Rosemeyer et al., "Annal Biochem", 1981, 115(2), pp. 339–346.
Sariban–Sohraby et al., "Biochemistry", 8/12/86, 25(16), pp. 4639–46.
Kruckeberg et al., "Biochemistry", 1978, 17(21), pp. 4376–82.
"Affinity Chromatography", Rodney R. Walters, Analytical Chemistry, vol. 57, No. 11, Sep. 1985, pp. 1099A–1114A.
"Fast Affinity Chromatography", Biotechnology, vol. 4, pp. 519–521.

Primary Examiner—Barry S. Richman
Assistant Examiner—Lyle Alfandary-Alexander
Attorney, Agent, or Firm—Poms, Smith, Lande & Rose

[57] ABSTRACT

The invention relates to a high performance affinity chromatographic system characterized by an immobilized active substance interacting weakly ($K_{diss} > 10^{-3}$ M) with the desired structure of the type or types of molecule to be separated. The substance is covalently bound in its active state on a carrier of a solid, preferably porous, organic or inorganic material thereby making it suitable for use in the so-called HPLC or HPLAC technique for the separation of e.g. biomolecules. Examples of useful inorganic materials are silica or glass, or organic materials such as plastics or polysaccharides. Separation takes place by the mobile liquid being led through the column packed with the immobilized active substance of weak affinity for the complementary substances. Examples of such immobilized ligands are antibodies or fragments thereof, antigens or fragments thereof and various receptor substances.

14 Claims, No Drawings

METHOD AND APPARATUS FOR ISOCRATIC AFFINITY CHROMATOGRAPHY

STATE OF THE ART

Affinity chromatography is a method of separation by which the substance or substances to be separated (ligates) are maade to interact specifically reversibly with a complementary substance (ligand) which is bound while in its active state to a stationary, solid phase. In practice, a movable liquid phase containing the substances to be separated is allowed to pass a solid phase with bound ligands, the separation thereby taking place by the desired substances being specifically adsorbed on the stationary phase, while other types of molecules will pass. The desired substances are finally eluated by employing various chemical and physical methods. In this manner it has been possible to purify in one single step the actual substance a great number of time (10–100).

One of the first applications of affinity chromatography was associated with the purificaation of α-amylase on insoluble starch (SStarakenstein, Biochem. Z., 24 (1910) 210). Not until the end of the 1960's, however, affinity chromatography was established as a method of separation in connection with the Axén synthesis of activated gels (Axén et al., Nature 214 (1967) 1302) and the Cuatrecass (J. Biol. Chem. 245 (1970) 3059) works on interaction between a bound ligand and a reversible desirable substance.

Parallel with these advancements, the traditional liquid chromatography was subjected to rapid development. The utilization of extremely small-sized particles (about 10 μm) as a stationary phase led to a considerable improvement of the separation capacity, the time of analysis simultaneously being drastically reduced. This technique, which would frequently generate high pressure drops, was given the name High Performance Liquid Chromatography (HPLC).

The introduction of affinity chromatography in HPLC in the late 1970's (Ohlson et al. FEBS Letters 93 (1978) 5), the High Performance Liquid Chromatography (HPLAC) signified an optimization of the affinity technique, primarily with regard to speed and dissolution. However, in comparison with other types of chromatography such as, for example, hydrophobic or ion exchange chromatography it appeared that the efficiency of HPLAC was apaproximately ten times lower than that of traditional HPLC enabling the generation of 10,000 to 50,000 theoretical plates per m, while the HPLAC technique presents about 100–2,000 theoretical plates per m. The use of more effective carrier material in affinity chromatography such as small-size particles could increase the performance up to level determined by the molecular interaction per se between the substance and the complementary ligand.

In order to optimize the efficiency, i.e. a high degree of dissolution, with fully maintained or partly remaining specificity, a completely novel strategy would be required for the choice of ligand, as well as better knowledge as to the design of the separation system.

The purpose of the present invention is to achieve an isocratic affinity chromatographic sysstem which is distinguished by high efficiency and short separation time. According to the invention, this object is accomplished with the system defined in the following patent claims and which will be described in more detail below.

DESCRIPTION OF THE INVENTION

For the sake of comprehension it is essential to explain briefly the kinetics for binding the substance (ligaate) to ligand and the influence thereof on the chromatographic retention; expressed for example in the capacity factor, k'.

Suppose the following simplified conditions which prevail in most cases: The substance (S) binds reversibly and non-covalently to the covalently bound ligand (L) on the surface of the stationary phase.

$$S + L \underset{k_{diss}}{\overset{k_{ass}}{\rightleftarrows}} SL \tag{1}$$

$k_{ass}$ = constant of association rate
$k_{diss}$ = constant of dissociation rate, and
SL = substance bound on the stationary phase The thermodynamic dissociation ($K_{diss}$) is given by $$K_{diss} = \frac{k_{diss}}{k_{ass}} = \frac{(C_{TOT} - C_{SL}) * C_S}{C_{SL}} \tag{2}$$

where
$C_{TOT}$ = conc. of active ligands
$C_{SL}$ = conc. of the SL complex
$C_S$ = conc. of free substance It is further assumed that there are no secondary equilibria present. Assume also that the adsorption isotherm is linear, which means that the chromatographic properties are independent of the substance concentration. Furthermore, we assume that in this performance $C_{TOT} - C_{SL} = C_{TOT}$.

The capacity factor k' is correlated to equilibrium, constants of rate and concentration of ligands via athe equation:

$$k' \approx \frac{C_{TOT}}{K_{diss}} = \frac{C_{TOT} * k_{ass}}{k_{diss}} \tag{3}$$

Part of the above reasoning has been derived from Chaiken (Anal. Biochem. 97 (1979) 1).

In order to reach a resonable retention $k_1 = 0.2 - 50$ and preferably $k' = 1 - 10$ in systems characterized by a weak interaction between ligand and ligate, a high ligand concentration (see Equation 3) would be required which is normally the case in ion exchange or hydrophobic chromatography, for example.

Band broadening in a chromatographic process is determined by a number of factors such as diffusion of the sample in the mobile and the stationary phase. The theory of this process has been thoroughly investigated by Horvath and Lin (J. Chromatogr., 149 1978) 43) and is briefly discussed in the following. The total band broadening (efficiency) of a substance expressed in $H_{tot}$ (the height of a theoretical plate) is:

$$H_{tot} = H_{disp} + H_{phd\ ext\ diff} + H_{int\ diff} + H_{kinetic} \tag{4}$$

The first three terms correspond to the non-kinetic contributions to band broadening and represent the spread of the sample in the mobile phase $H_{disp}$, at the matrix surface $H_{ext\ diff}$ and within the matrix pores $H_{int\ diff}$. These parameters constitute a function of chromatographic and structural conditions such as particle size, sample diffusivity and packing specifications. Generally speaking, the use of smaller particles, high diffusivity in samples and a more even matrix packing are factors contributing to increased efficiency (reduced $H_{tot}$). The fourth term, $H_{kinetic}$, represents band broadening caused by association and dissociation of ligate from its immobilized ligand. It may be shown that $H_{kinetic}$ is proportional to the linear flow rate in the system and inversely proportional to the constant of association rate and dissociation rate, respectively. This means that weak binding (high $K_{diss}$ and high $k_{diss}$, respectively) will result in reduced $H_{kinetic}$, i.e. the non-kinetic band broadening effects will dominate the total efficiency ($H_{tot}$). In other words, the affinity system characterized by "weak" bindings will make maximum efficiency (minimum $H_{tot}$) possible. In these cases band broadening is determined by the non-kinetic elements.

In affinity chromatographic applications of today there are utilized moderate up to strong affinities between the immobilized ligand and the interacting substance. The dissociation constant ($K_{diss}$) normally lies within the range of $10^{-4}$ to $10^{-15}$ M. In most cases this circumstance leads to the chromatographic process becoming an adsorption/desorption technique. In other words, the capacity factor k' is extremely large, see Equation 3, and may often amount to ten thousands of column volumes. With the employment of such strong affinities in HPLAC using small, about 10 μm rigid particles to minimize the non-kinetic effects, the efficiency is expressed in theoretical plate numbers for example, which are primarily dependent on the inert kinetics between ligand and ligate. The slow dissociation of a ligate from its immobilized ligand plays a leading role here (the constant of dissociation rate, $k_{diss} \approx 10^{-5} - 10$ sek$^{-1}$). For weak affinities, $K_{diss} > 10^{-3}$, the rate constants are rapid and equal, whereas for strong affinities the dissociation rate in particular will gradually slow down, the dissociation rate decelerates. In ion exchange or hydrophobic HPLC, for example, the interaction between the stationary phase and the substances is generally based on weak, non-covalent bindings ($\approx 10^{-2} > K_{diss} > 0$) with high dissociation rates.

In many respects, nature's own "communication" between different types of molecules and cells are based on weak affinities. As an example of such molecular interactions can be mentioned the capability of the complementary factor C1Q to differentiate between monomeric immunoglobuline (weak binding: $K_{diss} \approx 10^{-2} - 10^{-3}$ M) and immunocomplex (strong binding: $K_{diss} \approx 10^{-6} - 10^{-9}$ M).

In this case advantage is taken of the cooperativity involving coaction between several individually weak bindings which together produce a high binding strength (high avidity). Another example is the cell-cell interaction whereby a high surface density of weak binding seats per se ($K_{diss} \approx 10^{-1} - 10^{-2}$ M) may provide a sufficiently high degree of binding strength between various types of cells.

According to the invention there is achieved an affinity chromatographic system wherein the interaction between the immobilized ligand and other substances is characterized by low affinity ($K_{diss} > 10^{-3}$ M). The specificity wanted is attained in that the number of multipe weak interactions with the staationary phase is large enough for enabling the system to discern molecules of no interest, i.e. to differentiate between those totally incapable of binding to the ligand and those having affinity. To reach the inventive results, the properties of the carrier should be such (see below) as to provide high efficiency in the form of a high degree of diffusivity, for example. Also essential is that the nature of the carrier material enables it to bind large volumes of active ligand ($> \approx 1$ mM), which demand would be met i.a. by chosing the appropriate carrier porosity, and by supplying mild immobilizing conditions.

According to the invention there is created an isocratic affinity chromatographic system wherein the different substances are separated on the basis of their retardation. This could be of vital interest in preparative affinity chromatography involving many times the loss of material by utilizing elution techniques of varying strengths. The immobilized ligand is characterized by being immobilized on a microparticular carrier of preferably porous material which could for example be inorganic materials such as glass or silica, or organic materials such as various types of plastics or polysaccharides. According to the invention, the matrix should be microparticular with a particle size of up to 25 μm, preferably 3–10 μm. The material could have a pore size of up to 1,000 Å, preferably 10–500 Å.

The immobilized active ligand is not restricted to any specific type of ligand beyond the demands on properties described above. Examples of such ligands are antibodies or fragments thereof, antigens or fragments thereof, carbohydrates, enzymes with their substrates and inhibitors and receptor-interacting substances.

The ligands subjected to previous studies on affinity chromatography were typically characterized by their high affinity when bound to ligates. In the past, ligands suitable for use with the invention were difficult to obtain, but with the development of the so-called hybridome technology for the production of monoclonal antibodies (Köhler and Milstein, Nature, 256 (1975) 495), affinity ligands having a predetermined, low affinity are available today reproducibly and in large amounts. In practice, the tool required to work the invention is now accessible.

The immobilization technology employed by the invention has the characteristic feature of effectively binding the ligand covalently while simultaneously maintaining optimal function. As to alternative methods of coupling for immobilizing the ligand, reference is made to Methods in Enzymology, vol. XLIV, 1976. As exemplary methods can be mentioned the coupling of ligands to isocyanate-, isothiocyanate-, mercapto-, epoxy-, aldehyde-, tosyl-, carbonyldiimidazole- and bromocyan-activated matrix, and binding to activated acid and ester groups on the stationary phase.

Utilization of the affinit chromatographic system according to the invention is not restricted to applications involving affinity separation exclusively, but combinations with other types of chromatography are also possible; so-called multidimensional chromatography techniques.

The invention will be described in the following by means if an exemplary embodiment wherein immobilized monoclonal antibodies are used for the separation of carbohydrate antigens.

(a) Production of monoclonal antibody covalently immobilized on microparticular silica gel:

The monoclonal antibody subjected to study in this example is a mouse IgG2a directed towards a specific carbohydrate determinant. The antibody is selected so as to indicate "weak" affinity towards its epitope (antigen determinant). The weak binding ($K_{diss} \approx 10^{-3} - 10^{-1}$ M) will vary in dependence on the physical conditions (pH, temperature, etc.) The antibody is taken from a mouse (ascites) and is purified in several steps (including ammonium sulphate precipiation and protein-A chromatography). The degree of purification is estimated to >95% (electrophoresis) with a remaining antigen-specific ctivity of >90%.

A 10 cm×5 mm I.D. SelectiSphere-10 Activated Tresyl column (Perstorp Biolytica, Lnd, Sweden) was washed with 40 ml of $H_2O$ and 40 ml of 0.2 M $NaH_2PO_4$, 0.5 M NaCl, pH 7.5 (coupling buffer) at a flow rate of 1.0 ml/min. Immobilization took place in a Shimadzu LC 4 HPLC machine (Japan) equipped with UV detector. A solution of 60 ml monoclonal mouse IgG2a with 2 mg/ml in a coupling buffer containing 0.1 mg/ml of carbohydrate antigen for preventing binding to the antigen binding site of the antibody was pumped through the column at a rate of 1 ml/min. The column was then washed with 40 ml of coupling buffer and with 60 ml of 0.2 M tris-HCl, pH 8, at 1 ml/min. Protective carbohydrate antigen was eluated with 100 ml of 0.1 M citrate, pH 3.0, at 1 ml/min. All processes were carried out at room temperature, 20°-22° C. A reference column without monoclonal mouse IgG2a was prepared analogously as above.

The volume of immobilized mouse IgG2a was estimated to 95 mg/g of silica (dry). The immobilized antibody was fully active when bound to its carbohydrate antigen, which would signify that the concentration of active immobilized ligand was pprox. $0.8 \times 10^{-3}$ M (two carbohydrate antigens are assumed to bind each antibody).

(b) Chromatography with monoclonal antibody silica:

The columns described above were used in a Varian LC 5500 (USA) with RI/UV detector. All chromatography was carried out at room temperature, 20°-22° C., under a normal pressure of 30 ATM at a rate of 1 ml/min. and injection volumes of 10 $\mu$l. The mobile phase used was 0.1 M of $NaH_2PO_4$, pH 7.5.

A plurality of different carbohydrate antigens with varying degrees of affinity were studied in the chromatographic system. These carbohydrate antigens were retarded by the column and yielded k'=0.3−0.8. The retardations attained correponded to a $K_{diss}$ of $10^{-2} - 10^{-3}$ M. The analysis time was <5 min. The column efficiency for these antigens was estimated to $10^4$ plates per m, or alternatively, to 0.1 mm constituting the height of a theoretical plate.

The conclusion reached signifies that the affinity systems described in the foregoing by way of example has high performance expressed in diffusivity and rate. The result should be compared with conventional affinity chromatography operating with plate numbers of paprox. $10^{-2}-10^{-3}$ plates/m.

Industrial usage

The application of a high performance affinity chromatographic system (HPLAC) characterized by weak interaction with inherent desired selectivity may lead to an upheaval of today's chromatographic techniques. The range of application for separation in its broadest sense will be considerably widened. The usefulness of the invention in this context encompass analytical and preparative applications for the diagnostic and characterization of molecular interactions, for example, as well as lenient and rapid isolation of e.g. medical substances and diagnostic reagents from various basic media such as fermentation solvents, synthesis media and blood sera.

I claim:

1. A method for separating a substance from a heterogeneous solution by isocratic affinity chromatography comprising the steps of:
   providing a stationary phase comprising microparticulate carriers having ligands bound thereto, said ligands being capable of weakly interacting with said substance wherein the thermodynamic dissociation constant for the interaction between said substance and ligand is greater than about $10^{-3}$;
   contacting said heterogeneous solution with said stationary phase under isocratic conditions where said substance weakly interacts with said ligand to provide separation of said substance from said heterogeneous solution under isocratic conditions.

2. An isocratic affinity chromatography method according to claim 1 wherein said ligand is a monoclonal antibody or fragments thereof.

3. A method according to claim 1 wherein said stationary phase is in the shape of a column having an upstreaam and a downstream endd, wherein said heterogenous solution is passed through said stationary phase from said upstream end to said downstream end to thereby provide said contact and separation of said substance under isocratic conditions.

4. An isocratic affinity chromatography method according to claim 1 wherein the capacity factor for the interaction between said ligand and substance is between about 0.2 and 50.

5. An isocratic affinity chromatography method according to claim 4 wherein said capacity factor is between about 1 and 10.

6. A system for conducting isocratic affinity chromatography wherein a substance is separated from a heterogeneous solution, said system comprising:
   a stationary phase comprising microparticulate carriers having ligands bound thereto, said ligands being capable of weakly interacting with said substance wherein the thermodynamic dissociation constant for the interaction between said substance and ligand is greater than about $10^{-3}$ wherein the heterogeneous solution is in contact with said stationary phase under isocratic conditions wherein said substance weakly interacts with said ligand to provide separation of said substance from said heterogeneous solution under isocratic conditions.

7. A system acording to claim 6 wherein said ligand is a monoclonal antibody or fragments thereof.

8. A system according to claim 6 wherein said stationary phase in the shape of a column having an upstream end and a downstream end, wherein said heterogeneous solution is passed through said stationary phase from said upstream end to said downstream end to thereby provide said contact and separation of said substance under isocratic conditions.

9. A system according to claim 6 wherein the capacity factor for the interaction between said ligand and substrate is between about 0.2 and 50.

10. A system according to claim 9 wherein said capacity factor is between about 1 and 10.

11. A stationary phase for use in a method for separating a substance from a heterogeneous solution by isocratic affinity chromatography, said stationary phase comprising microparticulate carriers having ligands bound thereo, said ligands being capable of weakly interacting with said substance wherein the thermodynamic dissociation constant for the interaction between said substance and ligand is greater than about $10^{-3}$.

12. A staationary phase according to claim 11 wherein said ligand is a monoclonal antibody or fragments thereof.

13. A stationary phase for use in isocratic affinity chromatography according to claim 11 wherein the capacity factor for the interaction between said ligand and substance is between about 0.2 and 50.

14. A stationary phase according to claim 13 wherein said capacity factor is between about 1 and 10.

* * * * *